United States Patent

[11] 3,600,746

[72] Inventors Robert E. Kostur
  Oak Brook;
  Robert J. Brown, Chicago, both of, Ill.
[21] Appl. No. 799,456
[22] Filed Feb. 14, 1969
[45] Patented Aug. 24, 1971
[73] Assignee Comet Industries, Inc.
  Bensenville, Ill.

[54] APPARATUS FOR MOLDING ARTICLES
  7 Claims, 6 Drawing Figs.
[52] U.S. Cl. .................................................. 18/1 FS,
  38/102.5, 26/57 R, 269/119
[51] Int. Cl. ..................................................... B29c 17/02,
  D06c 3/08, B25b 5/14
[50] Field of Search........................................... 18/1 FS, 19
  M, 1 FB, DIG. 48, DIG. 53; 38/70, 102, 102.4,
  102.5, 102.41; 26/51, 51.4, 52, 54, 57, 58, 61;
  69/19.1, 19.3; 269/111, 119

[56] References Cited
  UNITED STATES PATENTS
1,392,123  9/1921  Danisi .......................... 38/102.5

| | | | |
|---|---|---|---|
| 2,759,217 | 8/1956 | Peterson........................ | 18/1 |
| 3,287,765 | 11/1966 | Puente .......................... | 18/19 |
| 3,457,608 | 7/1969 | Gagew........................... | 26/61 |

Primary Examiner—J. Spencer Overholser
Assistant Examiner—R. L. Spicer, Jr.
Attorney—Fidler, Bradley, Patnaude and Lazo ABSTRACT: Articles are molded by heating a sheet of thermoformable material, stretching it during the heating of the sheet to prevent it from sagging, and then forming the heated material into the article. The apparatus includes a clamping frame on which is slidably mounted a series of spaced-apart clamping assemblies for holding the marginal edges of the sheet to position it in a planar configuration. The clamping assemblies are moved farther apart by means of a series of piston cylinder assemblies to expand the frame thereby stretching the heated sheet to maintain its coplanar configuration during the heating thereof. By controllably moving the clamping assemblies toward one another to contract the frame during the subsequent forming of the article, the wall thickness of the article is controlled.

Patented Aug. 24, 1971

INVENTORS
ROBERT E. KOSTUR
ROBERT J. BROWN

BY
Fidler, Bradley & Patnaude

Att'ys.

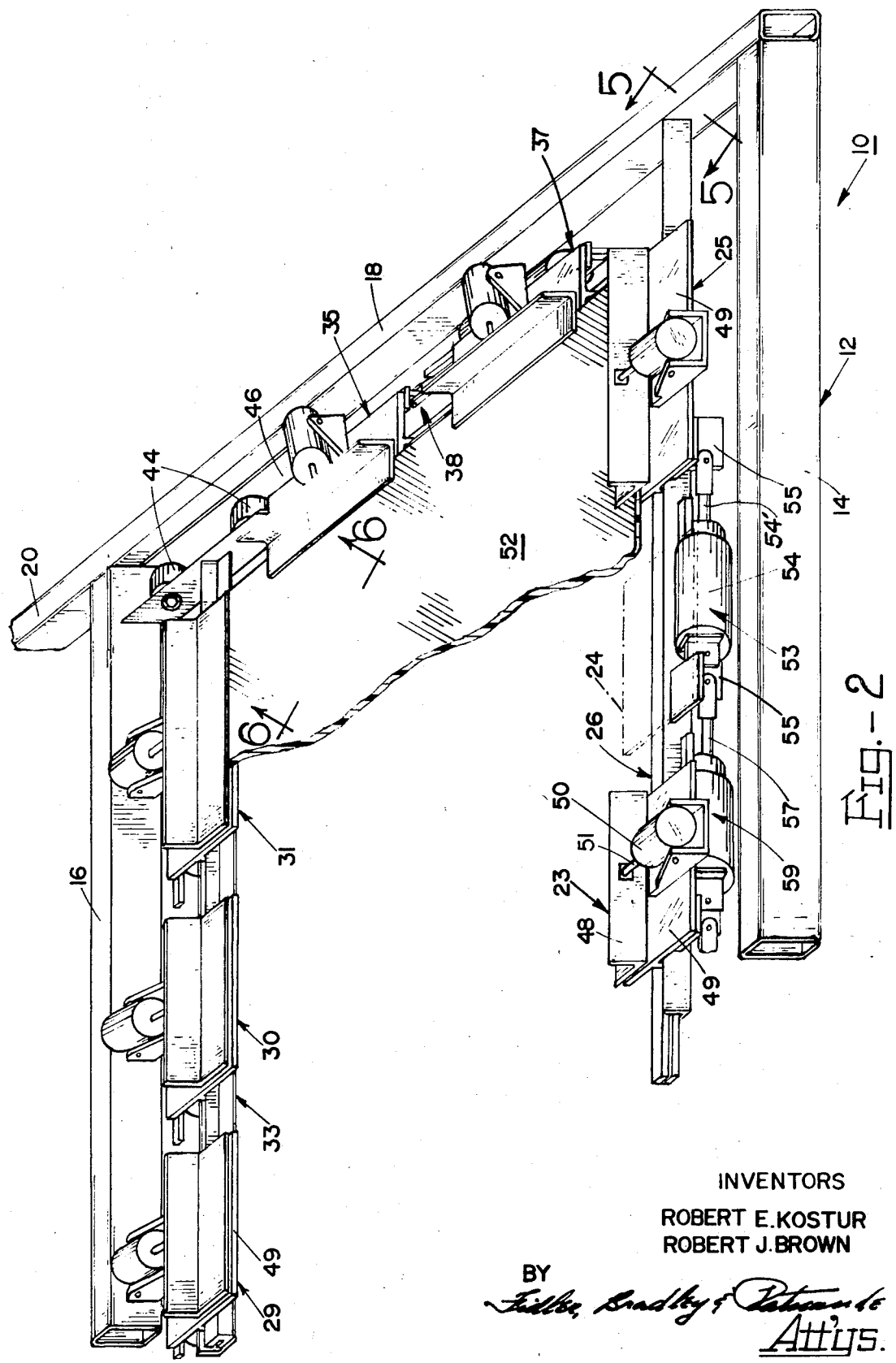

INVENTORS
ROBERT E. KOSTUR
ROBERT J. BROWN

BY

Fidler, Bradley & Patnaude

Att'ys.

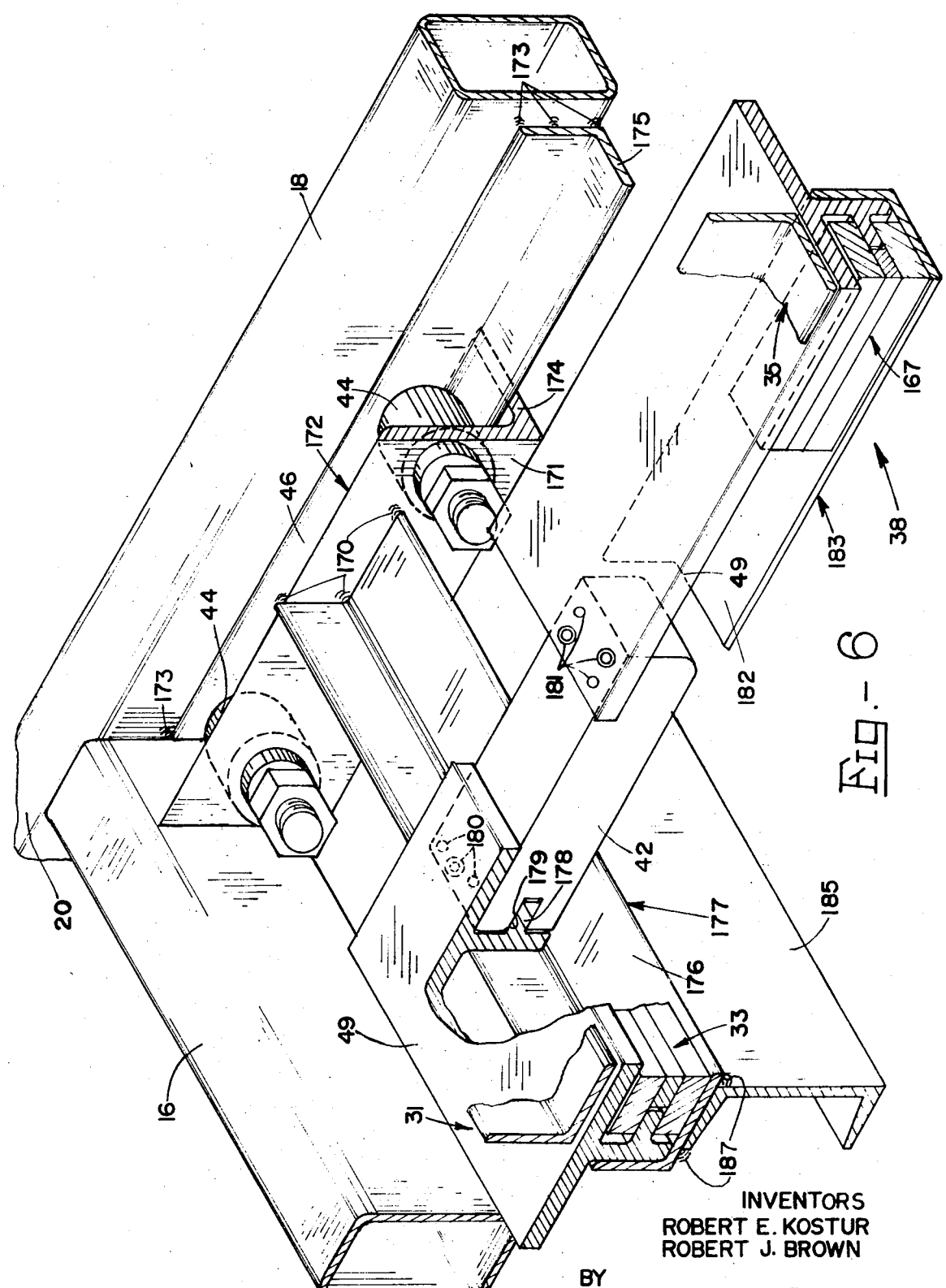

APPARATUS FOR MOLDING ARTICLES

The present invention relates to a method and apparatus for molding articles from thermoformable material, and it more particularly relates to a method and apparatus for holding a heated sheet of thermoformable material during heating thereof and during the subsequent forming of an article from the heated sheet.

In many cases, an article is molded from thermoformable material by supporting a sheet of the material in a clamping frame, and then the material is heated to soften it to a moldable condition. Thereafter, a mold member forms the article from the softened material. For example, in one type of vacuum forming process the softened material is drawn by means of suction into contact with the inner surface of a female mold and then the mold member is removed and the molded article is permitted to cool.

However, when a relatively large sheet of thermoformable plastic material is heated, it tends to sag in the middle, thereby making uniform heating of the sheet more difficult and necessitating greater spacing between the clamping frame and the underlying heaters or other apparatus. In an attempt to overcome this problem, according to one technique, a vacuum chamber was positioned directly above the clamping frame to apply an upwardly directed pressure on the heated sheet to prevent it from sagging. However, this technique was not entirely satisfactory since the vacuum chamber was disposed over the entire sheet, and thus loading and unloading of the clamping frame could not be quickly and easily performed. Moreover, as the heated sheet was drawn into the mold, it was not possible to control the feeding of selected portions of the sheet into the mold. Accordingly, it would be desirable to prevent the sheet from deforming while it is being heated and to have localized control of the sheet during forming of the article for certain applications, such as deep-draw molding where it is difficult to control the wall thickness of an article having a relatively large depth.

Therefore, it is the principal object of the present invention to provide a new and improved method and apparatus for molding an article from thermoformable material.

Another object of the present invention is to provide a new and improved method and apparatus for preventing a heated and softened sheet of thermoformable material from sagging during the step of heating the sheet in a molding process.

A further object of the present invention is to provide a new and improved method and apparatus for molding an article having a relatively large depth and having uniform-size wall thickness.

Briefly, the above and further objects of the present invention may be realized by providing an expandible clamping frame which includes a fixed frame on which a plurality of spaced-apart clamping assemblies are slidably mounted for holding the marginal edges of a sheet of thermoformable material to support it in a planar configuration during heating. There is also provided means, such as piston cylinder assemblies, for moving the clamping assemblies farther apart to stretch the heated sheet to maintain its coplanar configuration while it is being heated and softened, thereby preventing sagging or other deformation of the softened material. Moreover, selected ones of the clamping assemblies can be moved toward one another to contract the frame during the subsequent forming of the heated material to better control the wall thickness of the formed article.

The invention, both as to its organization and method of operation, together with further objects and advantages thereof will best be understood by reference to the following detailed description taken in connection with the accompanying sheets of drawings, wherein:

FIG. 2 is a fragmentary, isometric view of a portion of the clamping frame of FIG. 1, a portion of the frame being shown in phantom lines for illustration purposes;

FIG. 6 is an enlarged, isometric cross-sectional view of the clamping frame of FIG. 2 taken substantially along the line 6—6 thereof with portions being broken away for illustration purposes.

In accordance with the present invention, a sheet of a thermoformable plastic material is held in a planar configuration by a clamping frame. The periphery of the sheet is secured to the frame by a plurality of spaced-apart clamping assemblies which may be automatically operated by suitable means, such as pneumatic cylinders or electric solenoids. The clamping assemblies are slidably mounted on a fixed frame and are interconnected by piston cylinder assemblies which may be selectively or simultaneously operated to move the clamping assemblies relative to one another. After the sheet has been secured to the frame, heat is applied to the sheet thereby to render it soft and pliable. During the heating operation, the piston cylinder assemblies interconnecting the clamping assemblies are operated to expand the clamping frame to stretch the heated sheet to maintain its planar configuration, whereby sagging, wrinkling or other deformation of the sheet is prevented, and, if desired, controlled or selective stretching may be achieved.

After the sheet has been properly heated and stretched, the heated sheet if formed into the desired article by means of vacuum forming. Where a vacuum-forming mold is used, a vacuum is drawn through suitable passageways in the female mold to suck the heated plastic sheet into conformity with the mold cavity. For certain applications where additional amounts of plastic material is required in certain areas of the mold, at least a portion of the frame may be contracted by moving selected ones of the clamping assemblies toward one another during forming of the article to feed an increased amount of the sheet of plastic material into the mold. As a result, uniform-size wall thickness of the article can be attained. After the article is formed and partially cooled, the mold is removed, and the formed article is further cooled and thus set.

Figure 1:
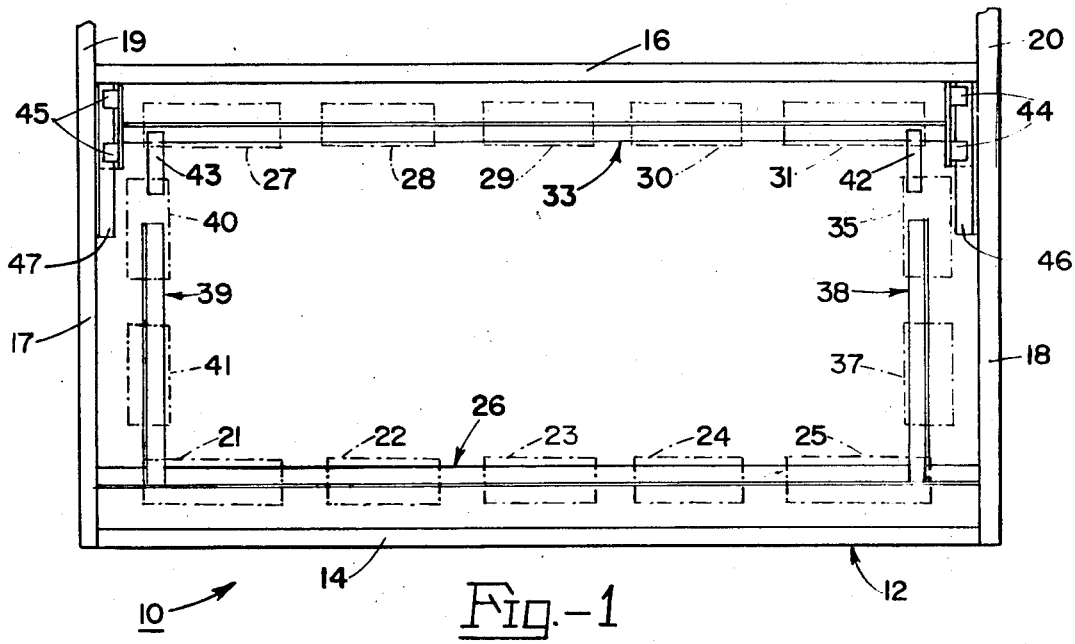
FIG. 1 is a diagrammatic view of a clamping frame embodying the principles of the present invention.

Referring now to the drawings, and more particularly to FIG. 1 thereof, there is shown diagrammatically a clamping frame 10 for use with a vacuum-forming machine such as is commercially available and with which the novel method and apparatus of the present invention may be used. The clamping frame 10 includes an outer fixed mounting frame 12 which comprises a pair of spaced parallel side members 14 and 16 to which are joined a pair of spaced parallel end members 17 and 18, to form a rectangle. As shown in the drawings, the mounting frame 12 is adapted to be mounted in a horizontal position on a movable carriage (not shown) of a molding machine by means of the extensions 19 and 20 of its respective end members 17 and 18.

A series of clamping assemblies 21, 22, 23, 24 and 25 are slidably mounted in a spaced-apart manner on a clamp track 26 which, as shown in FIG. 1, is located near the side frame member 14 and extends in a direction parallel thereto. Similarly, a series of spaced-apart clamping assemblies 27, 28, 29, 30 and 31 are slidably mounted on a clamp track 33 which extends in a direction parallel to and is shown to be spaced by a short distance from the side member 16. A plurality of spaced-apart clamping assemblies 35 and 37, are disposed near the end member 18 and are slidably mounted on a clamp track 38 which extends in a direction parallel to the end member 18 and spaced by a short distance therefrom. A clamp track 39 extends in a direction parallel to the clamp track 38 near the opposite end member 17 and supports a pair of clamping assemblies 40 and 41.

The clamping assemblies hold the periphery of a sheet of plastic material to support it in a coplanar configuration. In order to stretch the sheet during heating thereof, the clamping assemblies are moved farther apart to stretch the sheet and maintain it in its coplanar configuration when the sheet is heated. As shown in FIG. 1, the clamping frame 10 includes an arrangement of five clamping assemblies on each side and two clamping assemblies on each end, but it is to be understood that there can be a fewer or greater number of clamping assemblies for different applications. For example, a four by seven clamping frame has been built and successfully used.

All of the clamping assemblies of the clamping frame 10 are slidably mounted on their tracks with the exception of the middle clamping assemblies 23 and 29 which are fixedly connected to their respective side clamp tracks 26 and 33 and with the exception of the clamping assemblies 37 and 41 which are fixedly connected to their respective end clamp tracks 38 and 39. As more fully described hereinafter, the slidably mounted clamping assemblies are moved relative to the stationary clamping assemblies. For instance, the clamping assemblies 21, 22, 24 and 25 move toward and away from the middle stationary clamping assembly 23.

Since the middle clamping assemblies 23 and 29 are stationary, the middle portion of the sheet of plastic material extending between the clamping assemblies 23 and 29 remains stationary for proper alignment with the mold (not shown). However, for certain applications, instead of the middle clamping assemblies on the side clamp tracks, other ones of the clamping assemblies could be made stationary, such as one of the end clamping assemblies on each of the side clamp tracks.

In some applications, when the clamping assemblies are moved farther apart to expand the frame, opposite ones of the clamping assemblies on the side clamp tracks move as pairs away from their middle stationary clamp track to stretch the portions of the heated sheet between the clamping assemblies. At the same time, the end clamp tracks 38 and 39 are moved farther apart to expand the frame in a lengthwise direction to stretch the end portions of the sheet. For this purpose, as more fully described hereinafter, the right-hand end clamping assemblies 25 and 31 on the respective side clamp tracks 26 and 33 are fixedly connected to the ends of the end clamp track 38 to move it in unison with the clamping assemblies 25 and 31. Likewise, the left-hand end clamping assemblies 21 and 27 are fixedly connected to the ends of the clamp track 39. In order to connect the clamping assemblies 31 and 27 to the respective end clamp tracks 38 and 39, as shown in FIG. 1, the clamping assemblies 35 and 40 at the upper ends of the respective end clamp tracks 38 and 39 are fixedly connected to the respective clamping assemblies 31 and 27 on the clamp track 33 by means of a pair of connecting bars 42 and 43, respectively. For the purpose of connecting the clamping assemblies 25 and 21 to the respective end clamp tracks 38 and 39, the opposite ends of the clamp tracks 38 and 39 are fixedly connected to the respective clamping assemblies 25 and 21 and are slidably mounted on the side clamp track 26 to slide thereon in unison with the clamping assemblies 25 and 21.

When the clamping assemblies 35 and 40 move away from the respective stationary clamping assemblies 37 and 41, the side clamp track 33 moves farther away from the other side clamp track 26 to stretch the sheet of plastic material in a crosswise direction. For this purpose, the side clamp track 33 is rollably supported at each of its ends by means of a pair of rollers 44 and 45, which are supported by a pair of roller tracks 46 and 47, respectively. As a result, when the clamping devices 35 and 40 move relative to the stationary clamping devices 37 and 41, the clamp track 33 moves in unison therewith, whereby the clamp track 33 rolls along the roller tracks 46 and 47. Moreover, the portion of the sheet extending between the clamping assemblies 35 and 37 and the assemblies 40 and 41 are stretched accordingly.

Referring now to FIG. 2, there is shown an isometric view of a portion of the clamping frame 10, including some of the clamping assemblies. The clamping assemblies are of similar construction, and it should be understood that similar parts and arrangements are used on all of the clamping assemblies. As shown in FIG. 2, each of the clamping assemblies, such as the clamping assembly 23, generally comprises an L-shaped gripping member 48 pivotally mounted on the upper surface of a clamp plate 49 which is slidably mounted on the clamp track 26. An actuating means is mounted on the clamp plate 49 and comprises a housing 50 in which one end of a reciprocable shaft 51 is mounted. The other end of the shaft 51 is attached to the L-shaped gripping member. The housing 50 may contain a solenoid or a pneumatic cylinder for actuating the reciprocable shaft 51 to pivot the gripping member 48. The exact construction of the clamping assemblies is more fully described hereinafter in connection with FIG. 4. In accordance with this invention, a sheet of thermoplastic material 52 is positioned against the upper faces of the clamp plates 49, and the periphery thereof is clamped in the frame by the gripping members 48 of the clamping assemblies. Thereafter, heat is applied to the sheet 52 to soften it. As the sheet is being heated, the clamping assemblies are moved farther apart relative to one another to stretch the softened sheet 52 to maintain its coplanar configuration. As a result, the sheet 52 is prevented from wrinkling or sagging in its middle so that controlled or uniform heating of the sheet can be accomplished. Thereafter, the article is molded from the heated sheet 52. During the molding of the article in certain applications where an additional amount of plastic material is needed in a certain area of the mold, selected ones of the clamping assemblies may be moved toward one another to contract the frame so that an additional amount of the plastic material may be utilized in a particular portion of the mold.

In order to slide the clamping assemblies along their clamp track to expand or contract the frame, a series of piston assemblies, such as the assembly 53, are supported by the clamping plate 49 of the clamping assemblies. Each of the piston assemblies includes a housing, such as the housing 54 of the piston assembly 53 in which one end of a reciprocable rod 54' is mounted. A pneumatic cylinder is disposed within the housing 54 for moving the rod 54', but it is to be understood that an electric solenoid could also be used in place of the pneumatic cylinder. The other end of the rod 54' is attached to an L-shaped bracket 55 which is fastened to the clamp plate 49 of the clamping assembly 25 which is located to the right of the clamping assembly 24 as seen in FIG. 2. The opposite end of the cylinder housing 54 is connected to an L-shaped bracket 55 which is fastened to the clamping assembly 24 and to a reciprocable rod 57 of a piston cylinder assembly 59 which in turn is connected to the stationary clamping assembly 23. When actuated during the heating of the sheet 52, the piston assembly 59 moves its reciprocable rod 57 outwardly to move the clamping assemblies 24 and 25 rightwardly, as seen in FIG. 2, away from the stationary assembly 23 along the clamp track 26 to stretch the portion of the heated sheet 52 between the assemblies 23 and 24. In some applications, both of the piston assemblies 53 and 59 are actuated. As a result, the piston assembly 59 moves both of the clamping assemblies 24 and 25 toward the right as seen in FIG. 2 to stretch the portion of the sheet 52 between the assemblies 23 and 24. At the same time, the piston assembly 53 moves the clamping assembly 25 still farther to the right relative to the clamping assembly 24 to stretch the portion of the sheet 52 between the assemblies 24 and 25.

Moreover, in order to contract the frame, the cylinder assemblies can be operated independently to retract their piston rods to return the clamping assemblies toward their original position. As a result, after heating the plastic material 52, the frame can be expanded or contracted by any amount as a result of the independent movement of each of the clamping assemblies along their respective clamp tracks.

Figure 3:
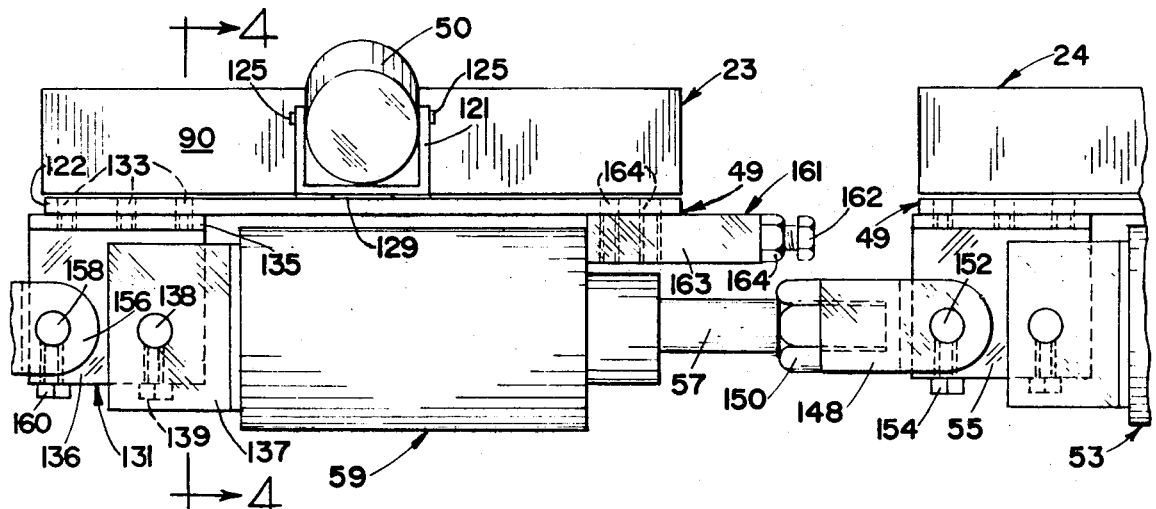
FIG. 3 is an enlarged, fragmentary elevational view of a pair of clamping assemblies and their piston cylinder assemblies for the clamping frame of FIG. 2.
Figure 4:
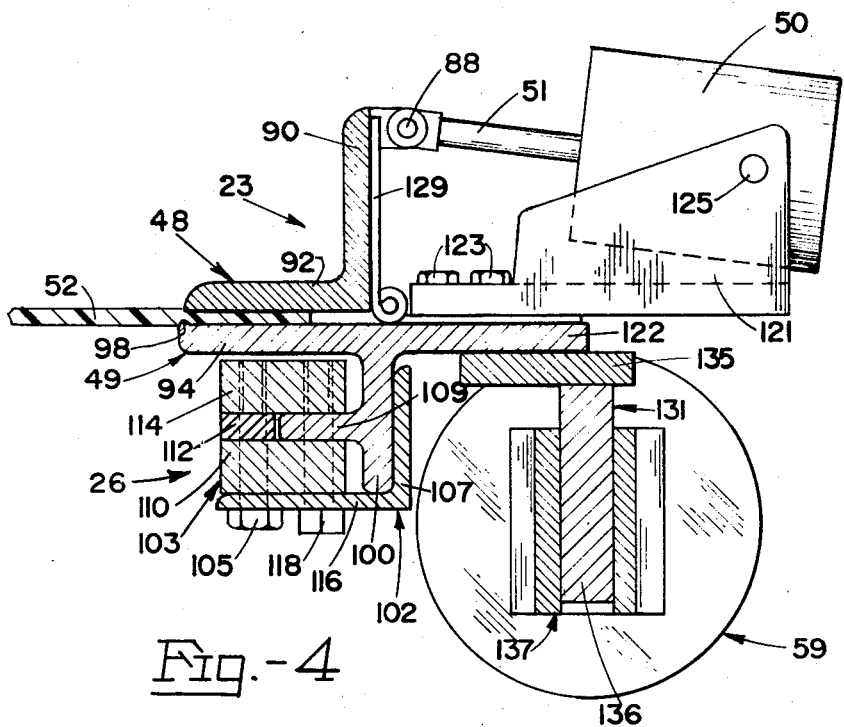
FIG. 4 is a cross-sectional view of one of the clamping assemblies and one of the cylinder assemblies of FIG. 3 taken substantially along the line 4—4 thereof.

Referring now to FIGS. 3 and 4, the clamping assemblies and piston cylinder assemblies connecting the clamping assemblies will now be described in greater detail. Since all of the clamping assemblies and piston assemblies are similar, only the clamping assembly 23 and the piston assembly 59 will now be considered. As best shown in FIG. 4, the clamping assembly 23 applies a uniform and constant pressure on the sheet 52, regardless of the cross-sectional thickness of the sheet or change in such thickness. The reciprocable shaft 51 of the cylinder 50 for the clamping assembly 23 is pivotally connected at 88 to an upper arm 90 of the pivotable L-shaped gripping member 48 having one leg 92 thereof adapted to clamp against the upper surface of the sheet 52. The leg 92 cooperates with a complementary leg 94 of the clamp plate 49 to clamp the marginal edge of the sheet 52 therebetween. The leg 94 includes a lip 98 on the upper marginal edge thereof to better grip the plastic sheet 52.

In order to support the clamping assembly 23 on the track 26, the clamp plate 49 has a centrally disposed depending flange 100 which is supported in the clamp track 26. The clamp track 26 comprises an angle iron rail 102 which is welded at its ends to the fixed frame 12, and a three-piece, U-shaped bar 103, which is fastened to the rail 102 by suitable means, such as the bolt 105. The flange 100 of clamp plate 49 extends between an upstanding flange 107 of the rail 102 and the three-piece bar 103 which receives a centrally disposed, horizontal flange 109 of the flange 100 to help support the clamp plate 49. The three-piece bar 103 comprises three separate bars 110, 112 and 114, which are secured to the horizontal flange 116 of the rail 102 by the bolt 105, which extends through aligned holes in the three bars and in the flange 116. The horizontal flange 109 is received between the outer bars 110 and 114. In the stationary clamps, such as the clamping assembly 23, there is provided a pair of square-head setscrews, such as the screw 118 which extends through aligned holes in the outer bars 110 and 114 and the horizontal flange 109 to prevent the clamp plate 49 from moving relative to the three-piece bar 103. The sliding clamping assemblies do not have the additional set screws 118 and are not otherwise fastened to their clamp tracks, and thus they are able to slide relative to their clamp tracks.

A clevis bracket 121 is fastened to the upper face of a leg 122 of the clamp plate 49 by suitable means, such as the bolts 123. The clevis bracket 121 is apertured to receive a pin 125 secured to the cylinder 50 to fixedly secure it during operation of the rod 51.

In order to assure uniform movement of the gripping member 48, a spring 129 is provided which bears against the upper arm 90 and which is secured between the leg 122 of the clamp plate 49 and the clevis 121 by the bolts 123. Thus, due to the uniform movement of the gripping member 48, the possibility of the let 92 damaging the plastic material 52, when it comes in contact therewith, is minimized.

As best shown in FIG. 3, the piston cylinder assembly 59 is supported by the leg 122 of the clamp plate 49 of the clamping assembly 23 and the clamp plate 49 of the adjacent clamping assembly 24. The rear end of the piston cylinder assembly 59 is connected to the clamp plate 49 by means of an L-shaped bracket 131 which is connected to and depends from the leg 122 of the clamp plate 49 by means of a plurality of countersunk bolts 133 which extend through aligned holes in the leg 122 and a horizontal leg 135 of the bracket 131. A vertical leg 136 of the L-shaped bracket 131 in turn is connected to a double clevis 137 at the rear end of the piston cylinder assembly 59 by means of a pin 138 which extends through aligned holes in the clevis 137 and the bracket 131 and is secured in place by a setscrew 139.

The front end of the piston cylinder assembly 59 is connected to the clamp plate 49 of the clamping assembly 24 by means of the L-shaped mounting bracket 55, which depends from the clamp plate 49 and connects the outer end of the piston rod 57 to the clamp plate 49. In order to connect the piston rod 57 to the clamp plate 49, a double clevis 148 is threaded onto the outer end of the piston rod 57 of the piston assembly 59 and is held in place by a nut 150, and the double clevis 148 is in turn connected to the mounting bracket 55 of the piston cylinder assembly 49 by means of a pin 152 which extends through aligned holes in the double clevis 148 and a hole in the mounting bracket 55. A setscrew 154 extends into a threaded hole in the bracket 55 to secure the connection between the clevis 148 and the mounting bracket 55. In like manner, a double clevis 156 of a piston assembly (not shown), which is connected to the adjacent clamping assembly 22, as shown in FIG. 1, is connected to the mounting bracket 131 by means of a pin 158 which is held in place by a setscrew 160.

In order to limit the movement of the clamping assembly 24 toward the clamping assembly 23, a stop assembly 161 includes an adjustable stop 162 in the form of a bolt which is threaded into the end of a block 163 and locked in place by means of a nut 164. The block 163 is fastened to the leg 122 of the clamp plate 49 for the clamping assembly 23 by suitable means, such as a plurality of countersunk bolts 164 extending through aligned holes in the leg 122 and the block 163. As a result, the position of the stop 162 relative to the block 163 can be adjusted to control the extent of movement of the mounting bracket 55 toward the piston cylinder assembly 59. The movement of the clamping assembly 24 away from the clamping assembly 23 is limited by the length of the stroke of the piston rod 57.

Figure 5:
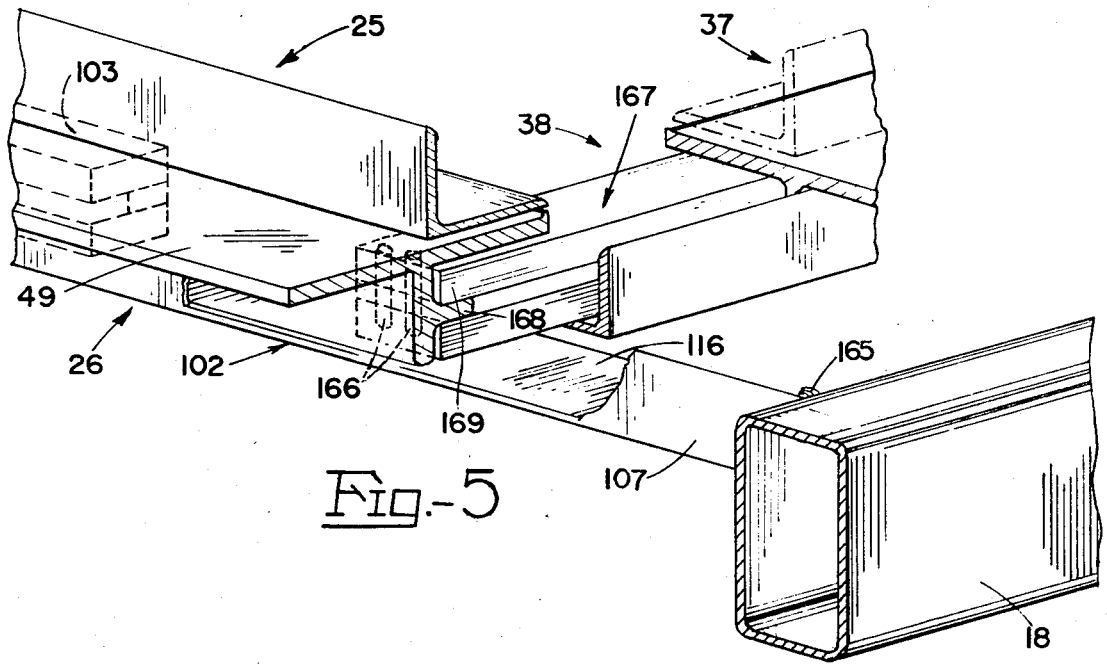
FIG. 5 is an enlarged, isometric cross-sectional view of the clamping frame of FIG. 2 taken substantially along the line 5—5 thereof with portions being broken away for illustration purposes.

Referring now to FIG. 5, there is shown the manner in which the side clamp track 26 is joined to the end clamp track 38. For the purpose of supporting the clamp track 26 by the mounting frame 12, the ends of the rail 102 of the side clamp track 26 are rigidly connected by suitable means, such as by welds, to the inner faces of the side members. In this regard, as shown in FIG. 5, one end of the rail 102 is connected to the side member 18 of the fixed mounting frame 12 by fillet welds 165. As shown in the drawings, the clamping frame 10 is illustrated in its maximum expanded position, and thus as shown in FIG. 5, the end of the three-piece, U-shaped bar 103 is spaced from the track 38. When the frame contracts, the end of the track 38 moves toward the U-shaped bar 103, whereby the end clamp track 38 slides on the horizontal flange 116 of the rail 102 between the end of the U-shaped bar 103 and the side member 18. The track 38 is fastened to the clamp plate 49 of the clamping assembly 25 by suitable means, such as the bolts 166 which extend through aligned holes in the U-shaped bar 167 of the clamp track 38 and a horizontal flange 168 of the clamp plate 49 of the clamping assembly 25. The bolts 166 are threaded into internally threaded holes in the upper bar 169 of the U-shaped bar 167. As a result, the end clamp track 38 moves in unison with the clamping assembly 25 and slides on the horizontal flange 116 of the rail 102.

Referring now to FIG. 6, there is shown the manner in which the end clamp track 38 is joined to the side clamp track 33. In order to rollably support the clamp track 33, the rollers 44 are attached to the ends of the clamp track 33. As shown in FIG. 6, the clamp track 33 is fixedly connected by fillet welds 170 to an upstanding flange 171 of an angle iron rail 172 on which are mounted the rollers 44 for rollably supporting the clamp track 33 on the roller track 46, which is secured to the inner face of the end member 18 of the frame 12 by the welds 173. The horizontal flange 174 of the angle iron rail 172 extends under and is slightly spaced from the horizontal flange 175 of the roller track 46 and the end frame member 18 to prevent the rollers 44 from accidentally moving in an upward direction and out of engagement with the track 46.

Referring now to FIG. 6, in order to cause the clamp track 33 to move in unison with the clamping assembly 35, the connecting bar 42 rests on a horizontal flange 176 of the angle iron rail 177 of the side along track 33 and is fixedly connected to the clamp plate 49 of the clamping assembly 31. In this regard, a horizontal flange 178 of the clamp plate 49 for the clamping assembly 31 is received by a slot 179 in one end of the connecting bar 42 and is connected thereto by means of a plurality of countersunk bolts and pins at 180 which extend from the underside of the bar 42 through aligned holes in the connecting bar 42 and the horizontal flange 178. The opposite end of the connecting bar 42 is fixedly connected to the clamp plate 49 of the clamping assembly 35 by suitable means, such as the countersunk bolts and pins at 181 which extend from the upper surface of the clamp plate 49 into the bar 42. Thus, one end of the clamp track 38 is supported by the side clamp track 46, as shown in FIG. 5, and the opposite end of the end clamp track 38 is supported by the rollably supported rail 177 of the side clamp track 33 by means of the connecting bar 42 and the clamp plate 49 of the clamping assembly 35, which in turn is slidably connected to the clamp track 38. As a result, when the clamping assembly 35 slides along its clamp track 38, the clamp track 33 moves in unison with the clamping assembly 35. When the clamping assembly 35 is moved toward the clamping assembly 37 to contract the frame from its maximum expanded position as shown in FIG. 6, the connecting bar 42 slides on the horizontal flange 182 of the angle iron rail 183, the end of the three-piece bar 167 being spaced from the end of the rail 183. When the clamping assembly 31 is moved relative to its clamp track 33, the end clamp track 38 is moved in unison therewith, and the connecting bar 42 and the clamp plate 49 of the clamping assembly 31 slide along the horizontal flange 176 of the rail 177 of the clamp track 33. As shown in FIG. 6, for stiffening purposes, a channel member 185 extends along the under side of the rail of the clamp track 33 and is welded thereto at 187.

OPERATION

Referring to the drawings, at the start of a molding operation, the piston cylinder assemblies move the clamping assemblies closer together to contract the frame from the maximum expanded position as illustrated in the drawings to a minimum contracted position as controlled by the stop members 161. After contracting the frame, the clamping assemblies are opened by activating the cylinders 50 of the clamping assemblies so that the sheet of plastic material 52 may be placed on the upper surface of the clamp plates 49. The gripping members 48 are then pivoted to close the clamping assemblies and grip the peripheral edges of the sheet 52 between the gripping members 48 and the clamp plates 49 to support the sheet in a coplanar configuration.

After the sheet 52 is held by the frame 10 in a coplanar configuration, heat is applied to the plastic sheet 52 to soften it to a formable condition. While the sheet 52 is being heated, the piston cylinder assemblies expand the frame to stretch the softened sheet to maintain its coplanar configuration so that sagging, wrinkling or other deformations of the sheet is prevented. In this regard, the side clamping assemblies are moved in pairs along their side clamp tracks 26 and 33 to stretch the portions of the sheet 52 between the clamping assemblies. For example, clamping assemblies 24 and 30 move as a pair away from their respective stationary clamping assemblies 23 and 29 by the same distance. Since the end clamping assemblies 25 and 31 are fixedly connected to the end clamp track 38 and the end clamping assemblies 21 and 27 are fixedly connected to the end clamp track 39, the end clamp tracks are moved away from the stationary clamping assemblies 23 and 29 to uniformly stretch the sheet 52 in a lengthwise direction. In so doing, the ends of the end clamp tracks 38 and 39 slide along the rails 116 and 177 of the respective clamp tracks 26 and 33. Moreover, the clamping assemblies 35 and 40 are moved as a pair away from their stationary clamping assemblies 37 and 41 to stretch the sheet 52 between the clamping assemblies on the end clamp tracks. In so doing, the side clamp track 33 is moved away from the fixed side clamp track 26 and rolls along the roller tracks 46 and 47 to expand the frame in a crosswise direction.

After heating the sheet 52, the sheet 52 is formed into an article. During the forming of the article, the frame is contracted to control the wall thickness of the article. In this regard, the clamping assemblies are moved closer together by means of the piston cylinder assemblies connecting them. After the article is formed, it is permitted to cool and then the clamping assemblies are opened to remove the article. Thereafter, the cycle may be repeated.

While the present invention has been described in connection with particular embodiments thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

We claim:
1. A clamping frame for supporting a sheet of thermoplastic material during the performance of an operation thereon, the combination comprising
   a frame,
   a first set of sheet-clamping devices movably supported by said frame,
   a second set of sheet-clamping devices movably supported by said frame,
   said clamping devices in each of said first and second sets being linearly arranged with the clamping devices in said first set being arranged parallel to the clamping devices in said second set,
   a third set of sheet-clamping devices movably supported by said frame,
   a fourth set of sheet-clamping devices movably supported by said frame,
   said clamping devices in each of said third and fourth sets being linearly arranged with the clamping devices in said third set being arranged parallel to the clamping devices in said fourth set,
   said first and second sets extending transversely to said third and fourth sets, and
   a plurality of means interconnected between adjacent ones of said clamping devices in each of said sets for independently controlling the spacing between the clamping devices in each of said sets.
2. A clamping frame as set forth in claim 1, wherein said plurality of means each comprises a fluid-operated cylinder assembly comprising
   a cylinder, and
   a piston reciprocable in said cylinder;
   means connecting said cylinder to one of said clamping devices, and
   means connecting said piston to the adjacent one of said clamping devices,
   whereby actuation of said cylinder assemblies moves adjacent ones of said clamping devices relative to one another.
3. A clamping frame as set forth in claim 2, comprising a first guide track supporting said first set of clamping devices,
   a second guide track supporting said third set of clamping devices,
   a third guide track supporting said fourth set of clamping devices, and
   means respectively connecting the end ones of said clamping devices in said first set to said second and third guide tracks,
   whereby actuation of said cylinder assemblies connected between the clamping devices in said first set moves said second and third tracks relative to one another by a distance equal to the sum of the relative movements of the clamping devices in said first set.
4. A clamping frame as set forth in claim 1, comprising
   a plurality of linear guide tracks arranged in a rectangle,
   means mounting said tracks on said frame with at least two adjacent ones of said tracks being movable, and
   means movably mounting the clamping devices in each of said sets on a respective one of said guide tracks.
5. A clamping frame as set forth in claim 4, comprising means connecting the end ones of the clamping devices in said first and second sets to the said tracks on which said clamping devices in said third and fourth sets are mounted.
6. An apparatus for use in molding articles from a sheet of thermoplastic material,
   frame means defining a space, a plurality of spaced-apart clamping assemblies movably mounted on said frame means for holding the marginal edges of said sheet to support it in a planar configuration in said space, and means for moving said clamping assemblies relative to one another during heating of said sheet to stretch it in the plane of said sheet to maintain it in its planar configuration in said space so that the sagging of the heated sheet is prevented; wherein said frame means comprises a pair of spaced side members and a pair of end members joining said side members, further including track means connected to said frame means for supporting said clamping assemblies thereon, said track means comprising a pair of spaced side clamp tracks extending in a direction parallel to said side members and a pair of spaced end clamp tracks extending in a direction parallel to said end members; wherein said means for moving said clamping assemblies comprises a plurality of piston cylinder assemblies, each of said cylinder assemblies including a housing fixedly connected to one of the clamping assemblies and a piston rod reciprocably mounted in the housing, the outer end of said piston rod being connected to another one of said clamping assemblies to move the last-mentioned clamping assemblies further apart to stretch the portion of said sheet between said last-mentioned clamping assemblies; wherein one of said side clamp tracks is a stationary clamp track rigidly connected to said frame means and the other one of said side clamp tracks is rollably supported by said frame means to roll toward and away from the stationary side track, one end of each of said end clamp tracks being rigidly connected to the rollably mounted side clamp track and the other end of said end clamp tracks being slidably supported by the stationary side clamp track and being fixedly connected to the end clamping assemblies mounted on the stationary clamp track so that the end clamp tracks move in unison with the end-clamping assemblies on the stationary clamp track, each of said end clamp tracks being connected to the rollably supported clamp track by a clamping assembly slidably mounted on the end clamp track, the last-mentioned clamping assembly being rigidly connected to the rollably supported side clamp track to move it in unison with said last-mentioned clamping device.

7. An apparatus according to claim 6 wherein each of said clamp tracks comprises a rail and a U-shaped member fixedly mounted on one flange of the rail and spaced from the other flange of the rail, each of said clamping assemblies including a clamp plate and a gripping member pivotally mounted on the clamp plate, said clamp plate having a depending flange extending between said rail and said U-shaped member, said depending flange having another flange extending therefrom and received by said U-shaped member.